Nov. 8, 1927.

P. E. HUSSEY 1,648,181

ICE CUTTING MACHINE

Filed Aug. 13, 1924

Inventor.
Pliny E. Hussey
by Heard Smith & Tennant.
Attys.

Nov. 8, 1927.

P. E. HUSSEY

ICE CUTTING MACHINE

Filed Aug. 13, 1924

Inventor.
Pliny E. Hussey
by Heard Smith & Tennant.
Attys.

Patented Nov. 8, 1927.

1,648,181

UNITED STATES PATENT OFFICE.

PLINY E. HUSSEY, OF BEVERLY, MASSACHUSETTS.

ICE-CUTTING MACHINE.

Application filed August 13, 1924. Serial No. 731,803.

This invention relates to ice-cutting machines and it has for one of its objects to provide a novel ice-cutting machine in which the saw is fed forward by a feed device which is operated from the power plant that operates the saw, and which is constructed to feed the saw forward at a speed having a fixed relation to the speed of the saw.

In the preferred embodiment of my invention the feed device is geared to the saw so that the saw and feed device will always have a fixed ratio relative to each other; this relationship being such that the saw will operate most efficiently.

Another object of the invention is to provide an ice-cutting machine in which the driving member can be adjusted vertically relative to the cutting saw, thereby to provide for making cuts of various depths.

Other objects will be hereinafter set forth in connection with the accompanying description of a selected embodiment of my invention.

In the drawings, Fig. 1 is a side view of an ice-cutting machine embodying my invention.

Figure 1:
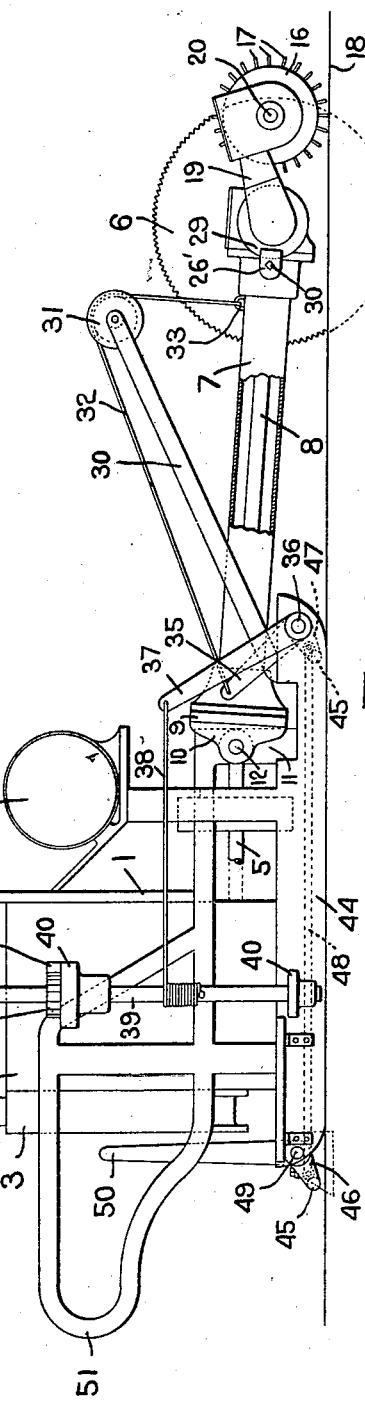
Figure 2:
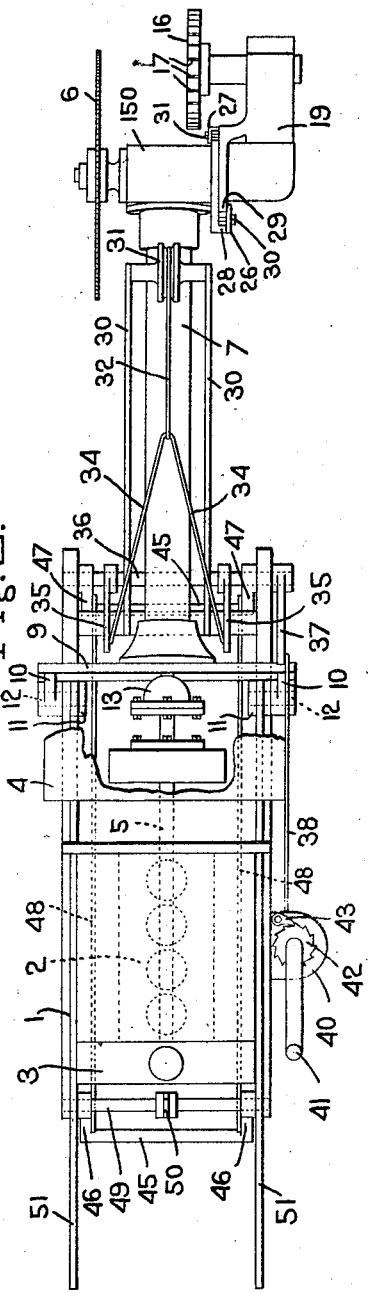
Fig. 2 is a plan view.

In the drawings, 1 indicates a frame on which a power plant is supported, the latter being indicated generally at 2. It is herein shown as an engine of the gasoline type, although any suitable power plant might be used. The engine herein shown has associated with it a radiator 3 forming part of the usual cooling system, and the fuel is supplied to the engine from a gasoline tank 4. 5 indicates the crank shaft of the engine.

The ice-cutting element is indicated at 6 and is in form of a circular saw. This cutter is carried on the end of an arm 7, which is pivoted to the frame 1, so that it can be raised or lowered. The arm 7 is herein shown as in the form of a transmission tube through which extends a drive shaft 8 that operatively connects the engine shaft 5 to the saw 6.

I have stated that the tube 7 is pivotally connected to the frame 1. This is herein provided for by securing the end of the tube to a yoke or cross member 9, which is provided at its end with arms 10 that are pivoted to brackets 11 formed on the frame as shown at 12. The drive shaft 8 which is situated within the tube 7 is connected to the engine shaft 5 by means of a universal joint 13 which is situated in the axial line of the pivots 12. This provides for raising or lowering the arm or tube 7 without interfering with the driving connection.

The saw 6 is carried on a shaft 14 which is journaled in a bearing in a transmission casing 150 secured to the end of the tube 7. The shaft 14 is connected to driving shaft 8 by means of beveled gears 15.

As stated above, one feature of my present invention relates to an ice-cutting machine which is provided with a positively-operated driving member that functions to drive the machine forward, said driving member having a definite speed of operation with relation to that of the saw.

In the preferred embodiment of my invention the driving member is in the form of a drive wheel, which is indicated at 16. This wheel is formed on its periphery with sharpened teeth 17 which provide the necessary gripping engagement with the surface 18 of the ice.

This feed wheel 16 is carried by the arm 7 and is geared to the saw 6 so that there is a definite speed relation between it and the saw.

Secured to the transmission casing 150 is a hollow bracket arm 19 provided with bearings in which is journaled a shaft 20 on which the driving wheel 16 is mounted, said shaft 20 extending parallel to the shaft 14. The shaft 20 is connected by a worm and gear 21 to an intermediate shaft 22 which is journaled in the hollow bracket arm 19 and which is connected to the shaft 14 by means of beveled gears 23. The feed wheel 16 is thus positively geared to the saw so that the two always have a definite speed relation to each other. This gearing is so designed that the saw will always be fed forward at the speed at which it will operate most efficiently. This I regard as quite an important feature of the invention because it insures that at all saw speeds the feeding will be automatically adjusted to give the greatest efficiency.

The feeding wheel is vertically adjustable relative to the saw so as to provide for making cuts of different depths. This is herein accomplished by swiveling the bracket arm 19 to the transmission casing 150 so that said bracket arm may be swung up or down relative to the head.

At the end of the transmission casing is a plate 24 through which the shaft 14 extends and which is provided with a circular rib 25 that is received in a circular groove 26 formed in the bracket arm 19. Both the rib and the groove are concentric with the shaft 14, and they serve to hold the bracket arm in this concentric relation as it is turned or adjusted about the axis of the shaft 14. The bracket arm is held in position by means of two clamps 26' and 27. The clamp 26 is in the form of a clamping plate one end of which rests against a lug 28 formed on the plate 24, and the other of which overlies the circular end 29 of the bracket arm 19. This clamping plate is held in clamping relation by means of a bolt 30. The other clamping member 27 has an angular shape, one end thereof resting against a flange or shoulder on the plate 24 and the other end resting against the bracket arm 19. A clamping screw 31 serves to hold this clamping member in its clamping position.

By loosening the screws 30 and 31 the bracket arm 19 may be adjusted angularly about the shaft 15, thus vertically adjusting the feed wheel relative to the saw. The relative position of the feed wheel and saw is what determines the depth of the cut. When the clamping bolts are firmly tightened the bracket arm 19 will be retained in its adjusted position.

I have stated above that the arm or tube 7 is pivotally connected to the frame so that it can swing vertically.

For thus adjusting the tube vertically I have provided the following mechanism: The frame has extending from it a boom 30 carrying at its end a pulley 31 over which passes a rope or cable 32 that is connected at one end to the arm 7 at 33. The other end of the rope or cable is forked as shown at 34 and the two branches thereof are connected to two arms 35 that are fastened on a rock shaft 36 journaled in the frame. This rock shaft has fastened thereto another arm 37 to which is connected one end of a cord or cable 38, the other end of said cable being wound about a spindle 39 which extends vertically and is journaled in suitable bearings 40 carried by the frame. This spindle is provided with a crank arm 41 by which it may be turned. The turning of the spindle in a direction to wind up the cable 38 will operate to raise the tube 7, as will be obvious, and when the spindle is turned in the other direction the tube 7 will move downwardly by gravity.

The spindle has fastened thereon a ratchet 42 which cooperates with a pawl 43 that normally prevents backward turning movement of the spindle.

With this arrangement the tube or arm 7 may be swung vertically whenever it is desired to elevate the saw off from the ice, and the pawl 43 will serve to hold the saw in its elevated position.

The raising of the arm 7 will also raise the entire cutting and driving assembly, since this constitutes a unitary structure that is carried by the arm.

The frame 1 is provided with main runners 44 that extend longitudinally or in the direction of the cut, and on which the frame moves during the sawing operation.

I have stated above that one feature of the invention relates to means for raising the frame to clear the runners 44 from the ice whenever it is desired to turn the machine or shift it longitudinally. Various devices for thus raising the frame might be employed. That herein shown consists of two transversely-extending runners 45 which are normally held in inoperative position above the surface of the ice, but which may be depressed into operative position, in which they support the frame.

One of these transversely-extending runners is carried by arms 47 that are loosely mounted on the rock-shaft 36, and the other transversely-extending runner is carried by arms 46 which are rigid with a rock-shaft 49 which extends transversely of and is journaled in the main runners 44. This rock-shaft 49 has rigid therewith an arm or handle 50 by which it may be turned, and the arms 46 are connected to the arms 47 by means of tie rods 48. When the arm or handle 50 is in a vertical position, as shown in Fig. 1, the transverse runners 45 will be elevated above the lower edge of the runners 44, and will thus be in inoperative position. This is the position of the parts when the saw 6 is operating.

Figure 3:
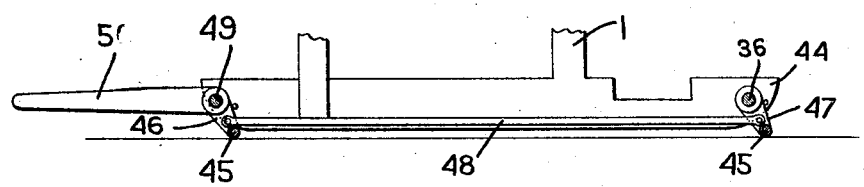
Fig. 3 is a fragmentary view showing the transverse runners in operative position.
Figure 4:
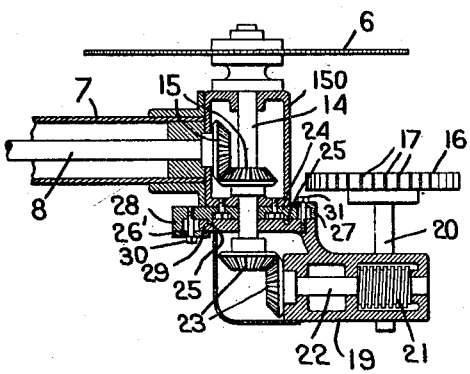
Figs. 4 and 5 are detail views of the gearing for driving the sawing element and drive wheel at a predetermined speed ratio relative to each other.
Figure 6:
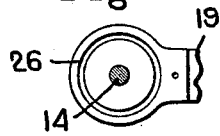
Fig. 6 is a fragmentary view of the bracket arm.
Figure 5:
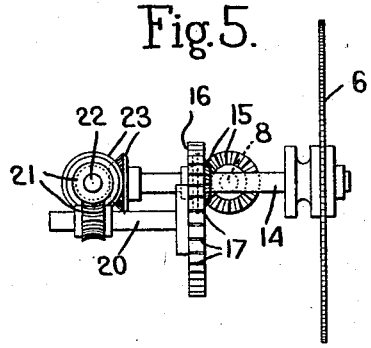

Whenever it is desired to shift the position of the machine laterally or to turn it around, the handle 50 is depressed into the position shown in Fig. 3, thereby swinging the arms 46 and 47 downwardly and carrying the runners 45 below the edge of the main runners 44. The runners 45 thus become operative to support the frame, and the latter may then be readily shifted transversely on these transverse runners 45. The machine can also be more readily turned around when supported on the runners 45 than when supported on the runners 44, because the transverse runners 45 are shorter than the longitudinal runners 44 and thus offer less resistance to the turning movement. The provision of these transverse runners 45 makes it possible for one man to turn the machine around or shift it longitudinally. It will be noted that the frame is provided with handles 51 for the operator to grasp when using the machine.

While I have illustrated herein one form of positively operated driving mechanism for feeding the saw forward, yet I do not wish to be limited to the exact form shown. Furthermore, I do not regard the invention as limited to the particular means shown for raising the main runners from the ice when it is desired to shift the machine transversely or turn it around.

Having fully described my invention, what I claim as new and desire to secure by Letters Patent is:

1. In an ice-cutting machine, the combination with a frame, of a power plant thereon, a transmission tube pivoted to the frame, an ice-cutting saw carried by the tube, a drive shaft in the tube operatively connecting the saw and power plant means for raising or lowering the tube, and a driven feed wheel carried by the tube and vertically adjustable relative to the saw.

2. In an ice-cutting machine, the combination with a frame, of a transmission tube pivoted to the frame, an ice-cutting saw carried by said tube, a drive shaft for operating the saw, said shaft extending through said tube, a drive wheel also carried by said tube and vertically adjustable relative to the saw, and means to operate the drive wheel from said drive shaft.

3. In an ice-cutting machine, the combination with a frame, of a power plant thereon, a transmission tube pivoted to the frame, an ice-cutting saw carried by said tube, a drive shaft extending through said tube and operatively connecting the saw and the power plant, a bracket arm carried by the tube and extending beyond the same, said bracket arm being adjustable vertically relative to the saw, a feed wheel carried by said bracket arm, and means for operating said feed wheel from said drive shaft.

4. In an ice-cutting machine, the combination with a frame, of a power plant thereon, a vertically-movable support, a shaft journaled therein, a saw carried by said shaft, means for operating said shaft from the power plant, a feed wheel also carried by said support and vertically adjustable thereon, and gearing connecting the feed wheel to the saw shaft.

5. In an ice-cutting machine, the combination with a frame, of a power plant thereon, a vertically-movable support secured to the frame, a shaft journalled therein, a saw carried by said shaft, means for operating said shaft from the power plant, a bracket member secured to said support and adjustable angularly about the axis of said shaft, and a feed wheel carried by said bracket member and operatively connected to the shaft.

6. In an ice-cutting machine, the combination with a frame, of a power plant thereon, a vertically-movable support, a shaft journalled therein, a saw carried by said shaft, a feed wheel carried by said vertically-movable support and situated beyond the shaft, said feed wheel being adjustable vertically relative to the saw, means operatively connecting the shaft to the power plant, and means for operating the feed wheel from said shaft.

7. In an ice-cutting machine, the combination with a frame, of a power plant thereon, a support pivoted at one end to the frame and adapted to be swung up and down, a shaft carried by the end of said support, a saw carried by the shaft, means operatively connecting said shaft to the power plant, a bracket arm secured to said support and extending beyond the latter, a shaft journalled in the extended portion of the bracket arm and situated beyond the support, a feed wheel carried by said shaft, said feed wheel being situated beyond the support, and gearing connecting the feed wheel shaft to the saw shaft.

In testimony whereof, I have signed my name to this specification.

PLINY E. HUSSEY.